United States Patent [19]

McWhirter et al.

[11] Patent Number: 4,825,072
[45] Date of Patent: Apr. 25, 1989

[54] METHOD AND APPARATUS FOR DETERMINING WELL FLUID FLOW VELOCITY USING A NONRADIOACTIVE TRACER

[75] Inventors: Vernie C. McWhirter, Pearland; Donald W. Oliver; David P. Hollingsworth, both of Houston, all of Tex.

[73] Assignee: Western Atlas International, Inc., Houston, Tex.

[21] Appl. No.: 911,859

[22] Filed: Sep. 26, 1986

[51] Int. Cl.$^4$ .............................................. G01V 5/10
[52] U.S. Cl. .................................. 250/259; 250/260; 250/356.1
[58] Field of Search .................. 250/259, 356.1, 356.2, 250/260, 390 R

[56] References Cited

U.S. PATENT DOCUMENTS

| | | | |
|---|---|---|---|
| 2,335,409 | 11/1943 | Hare | 250/260 |
| 2,739,476 | 3/1956 | Atkins | 73/155 |
| 3,019,341 | 1/1962 | Monaghan | 250/260 |
| 3,084,250 | 4/1963 | Dennis | 250/356.2 |
| 3,100,840 | 8/1963 | Morganstern | 250/380 |
| 3,115,576 | 12/1963 | Rickard | 250/259 |
| 3,248,540 | 4/1966 | Youmans | 250/43.5 |
| 3,558,888 | 1/1971 | Youmans | 250/83.1 |
| 3,577,158 | 5/1971 | Hahn | 250/356.2 |
| 4,032,781 | 6/1977 | Arnold | 250/266 |
| 4,166,215 | 8/1979 | Anderson | 250/260 |
| 4,166,216 | 8/1979 | Cubberly | 250/260 |
| 4,233,508 | 11/1980 | Arnold | 250/259 |

FOREIGN PATENT DOCUMENTS 10548  1/1980  Japan ................................ 250/356.1

OTHER PUBLICATIONS

Tsoulfanidis, "Measurment and Detection of Radiation", McGraw-Hill, New York, 1983, pp. 467-469.

Primary Examiner—Carolyn E. Fields
Attorney, Agent, or Firm—Patrick H. McCollum

[57] ABSTRACT

Method of determining the flow velocity of fluid flowing within the borehole of a well, traversing subsurface formations of the earth, with a nonradioactive tracer. A population of neutrons is generated in a stream of fluid so as to engulf a detector capable of detecting neutron capture. A substance of large thermal neutron capture cross section is injected into a stream of fluid a known distance upstream from a detector. Measurement of the elapsed time for the capturing substance to travel a known distance, and, by neutron capture, produce a minimum indication at the detector indicating the presence of said capturing substance at its location of closest proximity to the detector, allows calculation of the velocity of said stream of fluid.

10 Claims, 1 Drawing Sheet

METHOD AND APPARATUS FOR DETERMINING WELL FLUID FLOW VELOCITY USING A NONRADIOACTIVE TRACER

BACKGROUND OF THE INVENTION

This invention relates generally to method and apparatus for measuring the flow velocity of a stream of fluid; and more particularly to method and apparatus for measuring the flow velocity of the stream of fluid flowing within the borehole of a well, traversing subsurface formations of the earth, by use of a nonradioactive tracer substance.

Determination of well fluid flow velocity, and the corresponding well fluid flow rate, has long been regarded as standard practice in well management as such information can be used to ascertain the contribution of various strata to the total well flow during production (or, conversely, the relative extent of fluid injection into various strata during secondary recovery); or to evaluate the efficiency of fluid circulation within a well, among other uses.

Several methods of determining borehole fluid flow velocity are commonly used, and the invention described herein possesses distinct advantages over many of the methods. As prominent as any among these methods is that of injecting as slug of radioactive tracer substance into the stream of fluid flowing within the borehole and calculating the length of time required for the tracer material to flow a known longitudinal distance within the well to a radioactivity detector, or between two lonitudinally spaced detectors. This method is objectionable, and thus not favored by well operators, because of the concern of contaminating fresh water strata with radioactive matter, and the difficulty and expense of locating and segregating the radioactive matter at the well head and thereafter properly disposing of such matter. One of the several features, and advantages, of the present invention, is to therefore furnish a method of measuring borehole fluid velocity involving timed travel in the fluid stream flowing within the borehole of a nonradioactive tracer substance.

Another velocity measuring method which involves timing the travel of a detectable substance in the fluid stream flowing within the borehole is activation of oxygen atoms by neutron bombardment, which yields a radioactive isotope of nitrogen. The limitations of this method, to use with fluids containing water, is not possessed by the invention described herein; and one of the several features, and advantages, thereof is to furnish a method of measuring the borehole flow velocity of an aqueous or nonaqueous fluid involving the timed travel in the field stream flowing within the borehole of a nonradioactive substance.

Borehole fluid velocity can also be determined with a spinner flowmeter, wherein a blade mounted externally on a logging tool is caused to rotate by the fluid flow within the borehole, and measurement of the rate of rotation of the blade allows calculation of the borehole fluid velocity. However, the use of a spinner flowmeter is limited to those circumstances in which the fluid flowing within the borehole is traveling at a rate sufficient to rotate reliably the spinner blade. One of the several features, and advantages, of the invention described herein is that it can be used to measure borehole fluid flow velocity when the stream flowing within the borehole does not have sufficient velocity to rotate reliably a spinner blade.

Accordingly, the present invention furnishes improved methods and apparatus for measuring the velocity of the stream of fluid flowing within the borehole of well by detecting the travel time therein of a nonradioactive tracer substance.

SUMMARY OF THE INVENTION

Having in view the implementation of the aforesaid features, the method has been invented of determining the velocity of the stream of fluid flowing within the borehole of a well, traversing subsurface formations of the earth, using a nonradioactive tracer. A field of neutrons is generated in the stream of fluid by a radioactive source so as to engulf a detector. A substance having a large thermal neutron capture cross section is injected into the stream of fluid a known distance upstream from the detector. The stream of fluid flowing within the borehole carries the capturing substance into the neutron population, where neutron capture occurs. The detector indicates the occurrence of neutron capture, and consequently the proximity of the capturing substance thereto. Measurement of the time for the capturing substance to travel a known distance to reach said detector and by neutron capture produce a reading thereon indicating the presence of the capturing substance at its location of closest proximity to the detector, allows calculation of the flow velocity of the stream of fluid. Alternatively, the measurement of time can be made as the capturing substance travels between two such detectors spaced a fixed longitudinal distance apart.

DETAILED DESCRIPTION OF THE PREFERRED EMBODIMENT

Figure 1:
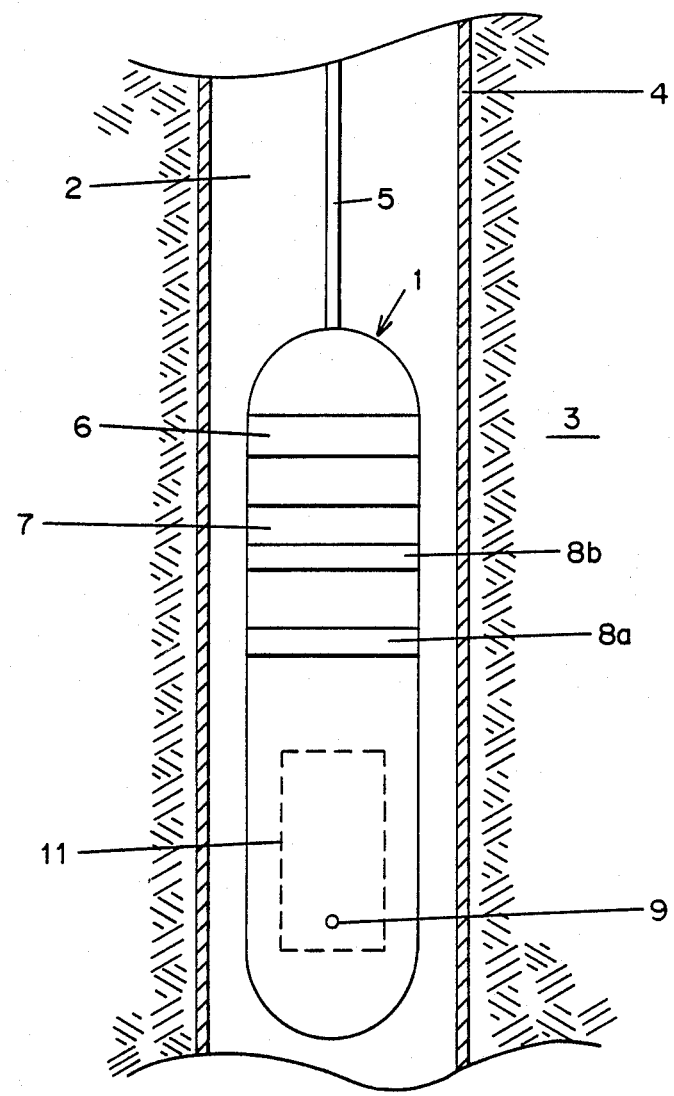
FIG. 1 is a schematic representation of a downhole well logging tool suitable for use in practicing the methods of the invention set forth herein.

A downhole well logging tool, of a type suitable for use in practicing the methods of the invention described herein below, is shown schematically in FIG. 1. Tool 1 is disposed within the borehole 2 of a well which has been drilled to traverse numerous strata 3 beneath the surface of the earth. The invention described herein functions with equal success in wells which are both cased and uncased, although it will typically be used in wells which contain casing 4, such as that shown in FIG. 1.

Tool 1 shown in FIG. 1 has been lowered into borehole 2 by means of wireline 5 attached to a powered winch located on the earth's surface (not shown). Wireline 5 contains not only the cable necessary to hold logging tool 1, but also the electrical conductors necessary to activate and operate tool 1 from the earth's surface, as more particularly hereinafter described.

Logging tool 1 includes the following: a source 6 capable of generating within borehole 2 a flux or dense population of neutrons; a nozzle 9 capable of injecting a tracer substance into borehole 2 out of a reservoir 11 in logging tool 1; a plurality of detectors 8 capable of detecting the capture by the tracer substance of neutrons present within the neutron population; and a radioactive shield 7 disposed between the neutron source 6 and the detectors 8 to prevent neutrons from directly bombarding detectors 8 from the direct flight within tool 1 of neutrons from the source 6. Each of the detectors 8a and 8b is located at a position on logging tool 1 which is a fixed longitudinal distance from each other as well as from nozzle 9.

In the preferred embodiment of this invention, logging tool 1 is deployed within borehole 2 such that the neutron source 6 is downstream, in terms of the direction of fluid flow, from nozzle 9. A dense population of neutrons is generated within borehole 2 by neutron source 6 in such fashion so as to engulf or surround detectors 8. A tracer substance in the form of a neutron capturing substance is injected into borehole 2 out of nozzle 9 and is carried by the fluid flowing within borehole 2 into the neutron field. The capture of neutrons out of the neutron field by the capturing substance is monitored at detectors 8, indicating the proximity of the capturing substance, consecutively, to detectors 8a and 8b. The length of time between the injection of the capturing substance into borehole 2 and the detection of proximity to consecutively, detectors 8a and 8b is measured. The length of time between the injection of the capturing substance into borehole 2 and the arrival at detector 8a is equivalent to the length of time for the capturing substance to be carried by the stream of fluid flowing within borehole 2 from nozzle 9 to detector 8a. The distance between nozzle 9 and detector 8a being known, dividing the fixed distance by the measured quantity of time furnishes a determination of the velocity of the stream of fluid flowing within borehole 2 in the vicinity of logging tool 1.

The corresponding calculation can be made based on the measured length of time between the arrival at detector 8a and that of detector 8b, and the known distance separating detectors 8a and 8b on logging tool 1. It will be readily apparent that the same method of calculation can be applied should there be more than two detectors spaced sequentially along logging tool 1.

The dense neutron population is created by the substantially continuous propagation into borehole 2, while the velocity measurement is being made, of the neutrons given from a neutron emitting source 6, such as an AmBe or CF225 source. Americium, being subject to radioactive decay, generates alpha particles, which, when they strike the beryllium source, yield carbon-12 plus a neutron $^9Be\ (\alpha,n)^{12}C$. The continuous propagation of the neutron population results in a saturated engulfing of detectors 8 with neutrons while the time measurements are being made despite the fluid flowing within borehole 1. It will be recognized that other sources of neutrons, which have had previous application to well logging, such as an accelerator of the deuterium-tritium reaction type, are available and are adaptable to use as the source of neutrons in this invention.

The capturing substance which is injected into borehole 2 from nozzle 9, and is carried by the fluid flowing within borehole 2 into the neutron population, can be any substance with a large thermal neutron capture across section. In the preferred method of performing a velocity determination by the invention described herein, such neutron capturing substance would be a substance such as boric (boracic) acid $H_3BO_3$, which, being soluble in methanol, would mix readily with water or oil when injected into the fluid flowing within borehole 2. It will be recognized, however, that other compounds of boron, and compounds containing such elements as gadolinium, samarium, would also possess a sufficiently large thermal neutron capture cross section and may be used with equal effectiveness. Any such neutron capturing substance does not contaminate the contents of the well and may be harmlessly left therein after the measurements of elapsed time, as prescribed by this invention, are completed.

Of particular importance in the practice of the invention is detection of the occurrence of neutron capture by the capturing substance dispensed out of a nozzle 9 inasmuch as activation of the detectors 8a and 8b denotes not only such capture but the proximity thereto of the capturing substance as well. Consequently, the method of detection does not just indicate proximity of the capturing substance to the detectors 8a and 8b as it is carried along by the stream of fluid, but should indicate the closest proximity, as the relevant time measurement is that which recognizes the occurrence of closest proximity of the capturing substance to the detectors 8a and 8b. In the preferred embodiment of this invention, therefore, detection of the occurrence of neutron capture is accomplished by the use of detectors which are capable of counting the neutron population, such as a Helium-3 or LiI detector. The neutron population will fall as the capturing substance is carried by the fluid flowing within borehole 2 into the neutron population and past detectors 8 before the population again builds as the capturing substance is carried further downstream. The minimum neutron population (maximum neutron absorption) would represent the point in time at which the capturing material is in closest proximity to detectors 8a and 8b.

In an alternative embodiment, detection of the occurrence of neutron capture can be accomplished by the use of a detector such as a scintillation detector, which is sensitive to the gamma rays which are given off by the neutron capture. Although the neutrons in the population will produce a low level of gamma rays by reaction with hydrogen in the fluid flowing within borehole 2, the count of gamma rays will reflect when the capturing substance enters the neutron population and reaches its point of closest proximity to detector 8a and 8b.

Those skilled in the art will be familiar with downhole logging tools presently available in the oil and gas industry which are adaptable for use in the practice of this invention, and in particular with logging tools which make possible steps such as: (1) the injection of a tracer substance into the stream of fluid flowing within the borehole of a well by remote control from the earth's surface; (2) measuring or detecting the activity or presence in the borehole of the tracer substance; (3) transmitting by circuitry to the earth's surface the signal or indication resulting from such measuring or detecting; and (4) simultaneously with the above, recording the depth within the borehole of the logging tool while the above steps occur. U.S. Pat. No. 3,248,540 issued Apr. 26, 1966 to A. H. Youmans, which is incorporated herein by reference, discloses typical downhole logging apparatus which are suitable for use in accomplishing the above steps.

While only particular embodiments of the present invention and modes of practicing same have been shown and described, it is apparent that changes and modifications thereto may be made within the scope of the appended claims without departing from the true scope and spirit of this invention, and the foregoing disclosure and description of this invention are not intended as a limitation on the scope thereof.

The embodiments of the invention in which an exclusive property or priviledge is claimed are defined as follows:

1. A method of determining the flow velocity of a flowing fluid comprising the steps of:
   generating within said fluid a population of neutrons;
   measuring within said fluid said population of neutrons;
   injecting into said fluid, at a point upstream of said neutron population, a neutron capturing substance, said substance having a large thermal neutron capture cross section;
   detecting at a fixed distance along the longitudinal axis of fluid flow the change in the measurement of said population of neutrons to indicate the occurrence of the capture of neutrons from said population by said neutron capturing substance; and
   determining the travel time of said substance from injection to the maximum change in said measurement of said population of neutrons.

2. The method of claim 1 wherein said neutron population is generated by a chemical source.

3. The method of claim 1 wherein said neutron population is generated by a deuterium-tritium accelerator source.

4. The method of claim 1 wherein the neutron capturing substance comprises a compound containing an element selected from the group consisting of boron, gadolinium, or samarium.

5. The method of claim 1 wherein said step of detecting the occurrence of neutron capture comprises the step of detecting the occurrence of neutron capture with a neutron detector.

6. A method for determining the velocity of a stream of fluid flowing within the borehole of a well traversing subsurface formations of the earth, comprising the steps of:
   generating within said stream of fluid a dense population of neutrons;
   measuring within said stream of fluid said population of neutrons;
   injecting into said stream of fluid, at a point upstream of said neutron population, a neutron capturing substance, said substance having a large thermal neutron capture cross section; detecting the occurrence of neutron capture by said capturing substance by measuring the change in said neutron population comprising:
   detecting, at a first point of detection, which is engulfed by said neutron population and which is downstream from the point of injection into said borehole of said neutron capturing substance, the arrival of said capturing substance at its location of closest proximity within said borehole to said first point of detection;
   detecting, at a second point of detection, which is engulfed by said neutron population and which is situated a fixed distance downstream from said first point of detection, the arrival of said capturing substance at its location of closest proximity within said borehole to said second point of detection; and
   measuring the length of time which elapses from the detection of the arrival of said capturing substance at its location of closest proximity within said borehole to said first point of detection until the detection of the arrival of said capturing substance at its location of closest proximity within said borehole to said second point of detection.

7. The method of claim 6 wherein said neutron population comprises a population of neutrons generated by the radioactive decay of AmBe.

8. The method of claim 6 wherein said neutron population comprises a population of neutrons generated by a deuterium-tritium accelerator.

9. The method of claim 6 wherein the neutron capturing substance comprises a compound containing an element selected from the group consisting of boron, gadolinium, or samarium.

10. The method of claim 6 wherein said step of detecting the occurrence of neutron capture comprises the step of detecting neutron capture with a neutron detector.

* * * * *